United States Patent [19]

Krehl

[11] Patent Number: 5,062,389
[45] Date of Patent: Nov. 5, 1991

[54] FEED CAR APPARATUS

[75] Inventor: Michael E. Krehl, Corunna, Ind.

[73] Assignee: CTB, Inc., Milford, Ind.

[21] Appl. No.: 570,386

[22] Filed: Aug. 21, 1990

[51] Int. Cl.$^5$ ............................................. A01K 5/02
[52] U.S. Cl. .................................... 119/57.6; 119/57.7
[58] Field of Search ................... 119/57.6, 57.5, 57.7, 119/56.2, 66.1, 57

[56] References Cited

U.S. PATENT DOCUMENTS

| | | | |
|---|---|---|---|
| 2,601,057 | 6/1952 | Roberts et al. | 119/57.6 |
| 3,037,671 | 6/1962 | Cochran | 119/57.1 |
| 3,273,539 | 9/1966 | Cooper | 119/57.6 |
| 3,776,194 | 12/1973 | Conley | 119/57.6 |
| 4,019,461 | 4/1977 | Keen et al. | 119/526 |
| 4,027,806 | 6/1977 | Weihmuller | 119/57.6 |
| 4,195,592 | 4/1980 | Siciliano | 119/17 |
| 4,337,729 | 7/1982 | Peppler et al. | 119/57.6 |
| 4,530,308 | 7/1985 | Sheets et al. | 119/57.6 |
| 4,597,361 | 7/1986 | Tudela | 119/57.6 |

Primary Examiner—Paul J. Hirsch
Attorney, Agent, or Firm—Trexler, Bushnell, Giangiorgi & Blackstone, Ltd.

[57] ABSTRACT

A modern feed car apparatus for supplying feed to an arrangement of animal or bird confinement cages which have feed trough means associated therewith. The feed car apparatus includes hopper means for a receiving and maintaining limited amounts of feed, support frame means for carrying the hopper means along and past the feed trough means, delivery means mounted for movement with the hopper means, and drive means for operating both the support frame means and the delivery means. The delivery means comprises a continuous moving conveyor element and housing for receiving feed from the hopper means when laying flat to insure proper filling of the conveyor element. In addition, the delivery means includes drop tube means and a leveling member to deliver feed into the feed trough means and accurately control the amount and level of feed delivered. The feed car apparatus further includes a unique vertical capstan, straight shaft combination for simply and effectively driving the feed delivery means without the need for timing belts, idlers, and timing belt pulleys.

16 Claims, 4 Drawing Sheets

FEED CAR APPARATUS

BACKGROUND OF THE INVENTION

1. Field of the Invention

In general, this invention relates to apparatus used in connection with the commercial feeding of birds or animals and, in particular, pertains to an improved feed car apparatus for automatically supplying feed to birds or animals confined in an arrangement of cages.

2. Description of Related Art

Modern commercial feeding of birds and animals typically requires the employment of sophisticated feeding and watering equipment. Due to strong competition in the egg-producing poultry industry, for example, the use of such equipment is usually a prerequisite to profitability.

One such device intended to minimize the cost of labor associated with feeding egg-producing poultry is seen in U.S. Pat. No. 4,337,729 which discloses a traveling hopper feed delivery system for feeding laying hens confined in a cage array. The array includes multiple tiers of cage rows extending several feet in length. The traveling hopper feed delivery system of the '729 patent delivers feed to feed receptacles extending from the confinement cages by use of a straight-line screw or auger means, of limited extent, mounted on a wall of a hopper member. The auger is positioned vertically and picks up feed from the hopper at a feed access point located at or immediately adjacent the bottom of the hopper. Sensor paddles positioned in the feed receptacles detect a predetermined level of feed and operate butterfly valves in an attempt to maintain a uniform level of feed in the receptacles.

Other examples of devices of the type to which this invention pertains are disclosed in U.S. Pat. Nos. 3,158,137; 2,786,448; 4,195,594; 4,019,461; 3,273,539 and Canadian Patent No. 720,664.

Except with respect to those aspects specifically discussed above, it is believed that a concise explanation as to the potential relevance of each of the prior art patents cited above is provided by the title and abstract of each.

OBJECTS AND SUMMARY OF THE INVENTION

It is a general objective of the present invention to provide an improved feed car apparatus for use in connection with the commercial feeding of birds or animals.

It is an associated objective to provide feed car apparatus for automatically supplying accurate, uniform levels of feed to birds or animals confined in an arrangement of cages.

It is a related objective to provide feed car apparatus including a continuous moving conveyor element for receiving feed in a horizontal position from a hopper means and delivering a constant, predetermined amount of feed to a feed trough means associated with said arrangement of cages.

It is yet another object of the present invention to provide feed car apparatus including a drop tube means for simple and accurate deposit of a predetermined level of feed in a feed trough means associated with said cage arrangement.

It is a collateral object of the present invention to provide leveling means for insuring the proper level and uniformity of feed within the feed trough means.

A further objective of the present invention is to provide a feed car apparatus having a mechanically straightforward conveyor element drive means which includes a vertical capstan means operatively associated with a straight shaft member for axially advancing and simultaneously rotating the continuous conveyor element about a helix axis thereof to ensure the delivery of a proper amount and constituent mix of feed to said feed trough means.

It is yet another collateral objective to provide feed car apparatus having hopper means constructed so as to promote feed fall and minimize feed bridging.

Other objects and advantages of the invention will become apparent upon reading the following detailed description and upon reference to the drawings. Throughout the description, like reference numerals refer to like parts.

Summarily stated, the invention comprises feed car apparatus for supplying feed to an arrangement of bird or animal confinement cages having feed trough means associated therewith, said feed car apparatus comprising a hopper means for receiving and holding a limited amount of feed, a movable support frame means operatively associated with the hopper means for carrying the hopper means along and past the feed trough means, feed delivery means mounted for movement in unison with said hopper means, and drive means operatively associated with the support frame means and the delivery means for moving the hopper means and for operating the delivery means, wherein the delivery means comprises a continuous moving conveyor element and housing for receiving feed in a horizontal position from the hopper means, a drop tube means for filling the feed trough means, and a leveling member operatively associated with the drop tube means for selectively controlling the amount of feed deposited and maintaining a uniform level of feed within the trough means.

Preferably, the drive means includes a vertical capstan member and associated straight shaft means for simply and effectively driving the feed delivery means and eliminating the need for timing belts, pulleys and idlers.

BRIEF DESCRIPTION OF THE DRAWINGS

The features of the present invention which are believed to be novel are set forth with the particularity in appended claims. The organization and manner of operation of the invention, together with further objects and advantages thereof, may best be understood by reference the following descriptions taken in connection with the accompanying drawings, in which:

DETAILED DESCRIPTION OF THE ILLUSTRATED INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Figure 1:
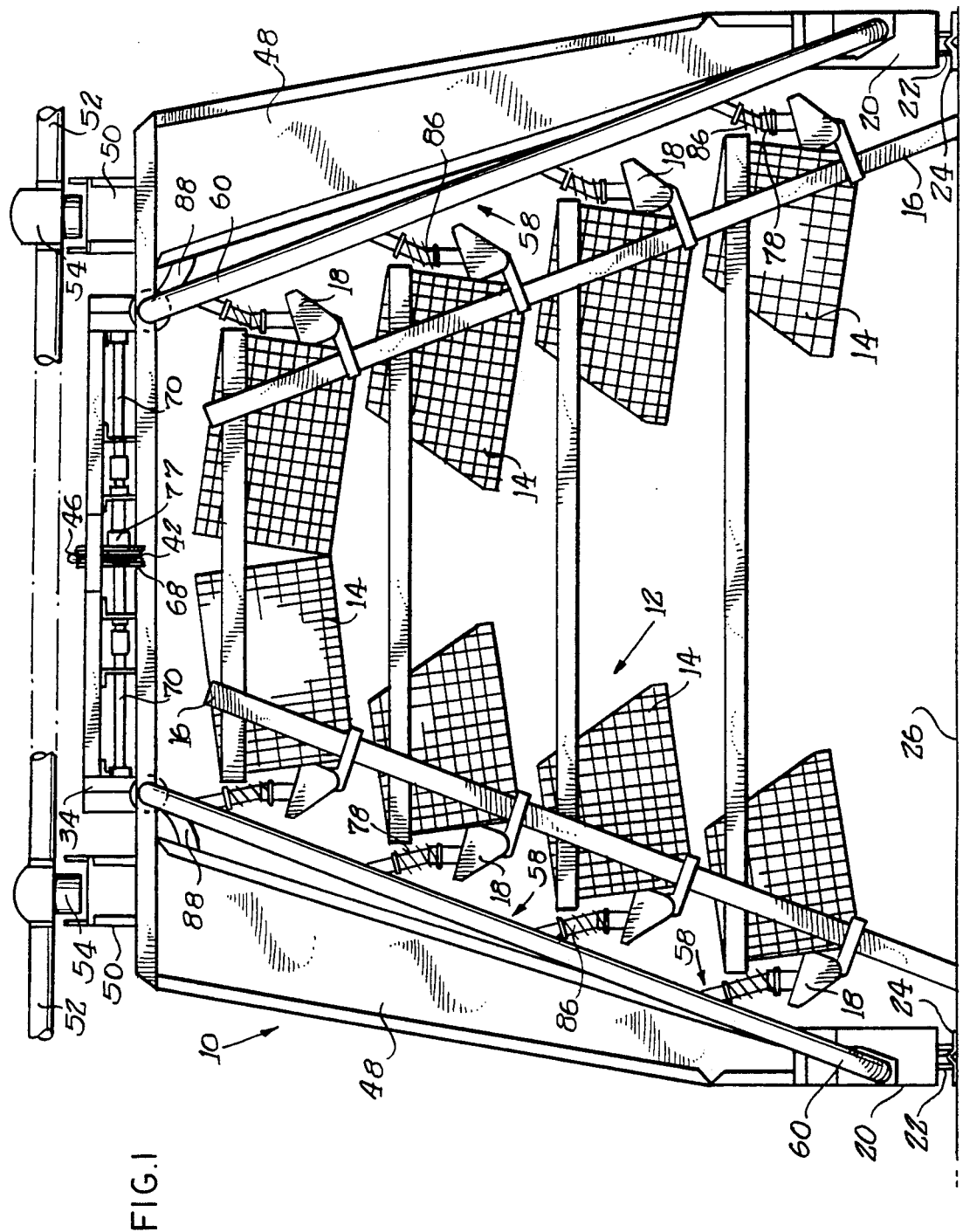
FIG. 1 is an elevational end view of the invention shown in operative relation with an arrangement of animal or bird confinement cages.

Referring first to FIG. 1, there is shown a feed car apparatus 10 of the present invention illustrated in operative association with an arrangement of confinement cages 12. The cage arrangement 12 comprises individual confinement cages 14 which are designed to house birds or animals for commercial breeding purposes and which, as shown, are mounted on an A-shaped structural framework 16. Also mounted on framework 16 are associated feed trough means 18 which are positioned in front of the cages 14 to provide access to the feed contained therein.

It should be noted at the outset that the illustrated feed car apparatus 10 is intended for use with the exemplary A-shaped cage arrangement 12, and that therefore, the feed car apparatus 10 is designed to service both sides of the double-sided, A-shaped cage arrangement 12. The invention is not limited to use with such an arrangement, however, and any modifications required to construct a feed car apparatus 10 suitable for use with a single-sided cage arrangement, for example, will be obvious to one of ordinary skill in this art. It should also be apparent that a cage arrangement 12 of this kind is normally situated within a poultry house or other type of confinement structure and that both the cage arrangement and poultry house can extend for several hundred feet in length.

Figure 2:
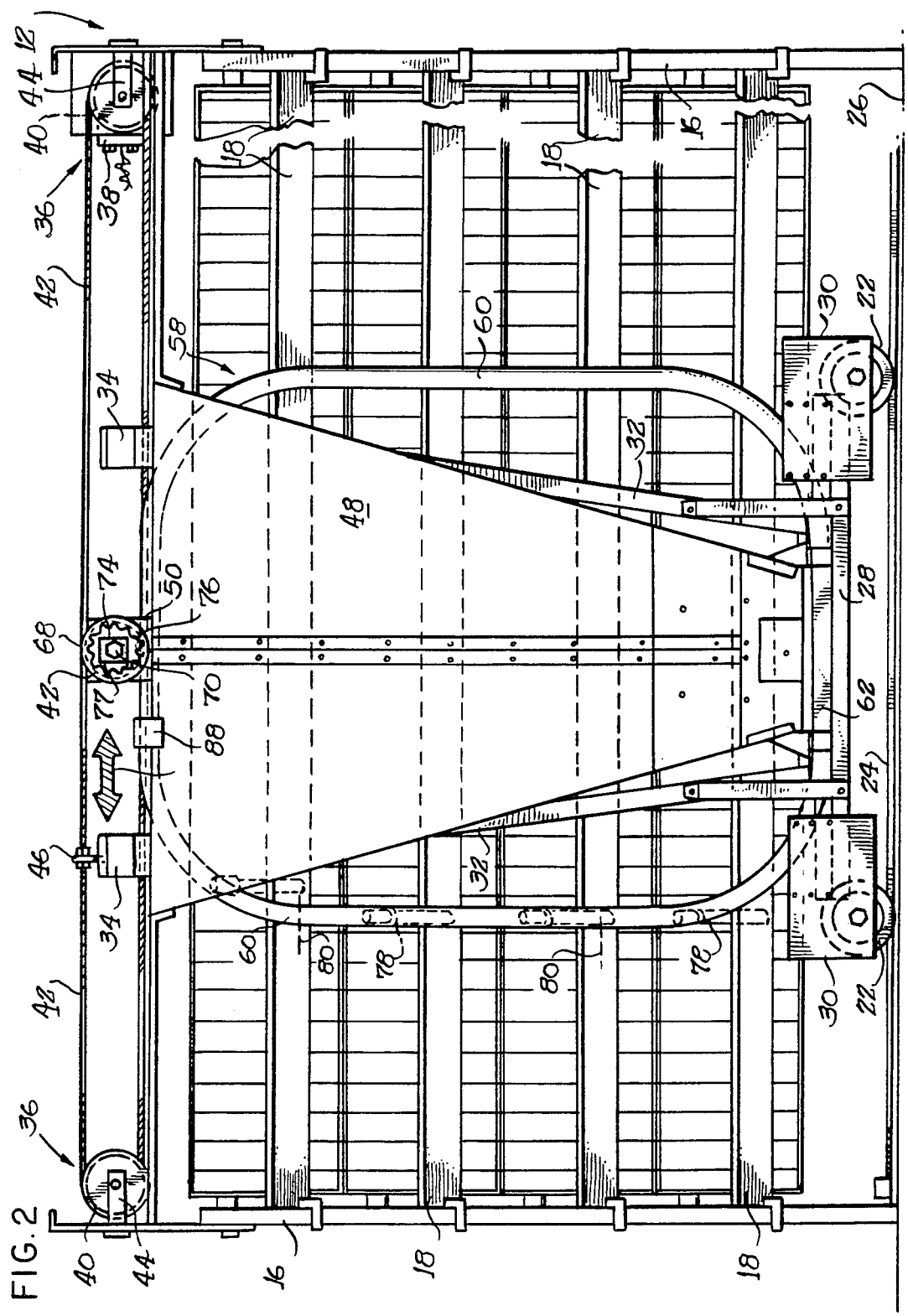
FIG. 2 is an elevational sideview of the invention as shown in FIG. 1.

Now referring back to FIG. 1, it will be seen that an embodiment of the feed car apparatus 10 in accord with the present invention first comprises movable support frame means 20 supported on two sets of rollers 22 for reciprocal movement along a pair of track members 24. The track members 24 are preferably secured to a flat surface, such as a poultry house floor 26, in known fashion. FIG. 2 reveals that each side of the movable support frame means 20 comprises a base member 28 on which the rollers 22 are rotationally mounted, in addition to roller guards 30, a side structure 32, and a linking number 34. Constructed as described above, the support frame means 20, straddles the cage arrangement 12 as can best be seen in FIG. 3.

Automatic reciprocal movement of the support frame means 20 on the track members 24 is achieved by providing the apparatus with a drive means 36. The drive means 36, as best shown in FIG. 2, includes a motor 38, drive pulleys 40 and a cable 42. Preferably, drive pulleys 40 are journaled for rotation on brackets 44 which are fixedly attached to the A-shaped structural framework 16 of the cage arrangement 12. Fastening the cable 42 to an extension 46 of the linking number 34 and energizing the motor 38 will then cause the support frame means 20 to move laterally on tracks 24 along both sides of the cage arrangement 12. Reversing the rotation of the motor 38 likewise will cause the support frame means 20 to move along the cage arrangement 12 on the tracks 24 in an opposite direction.

Figure 3:
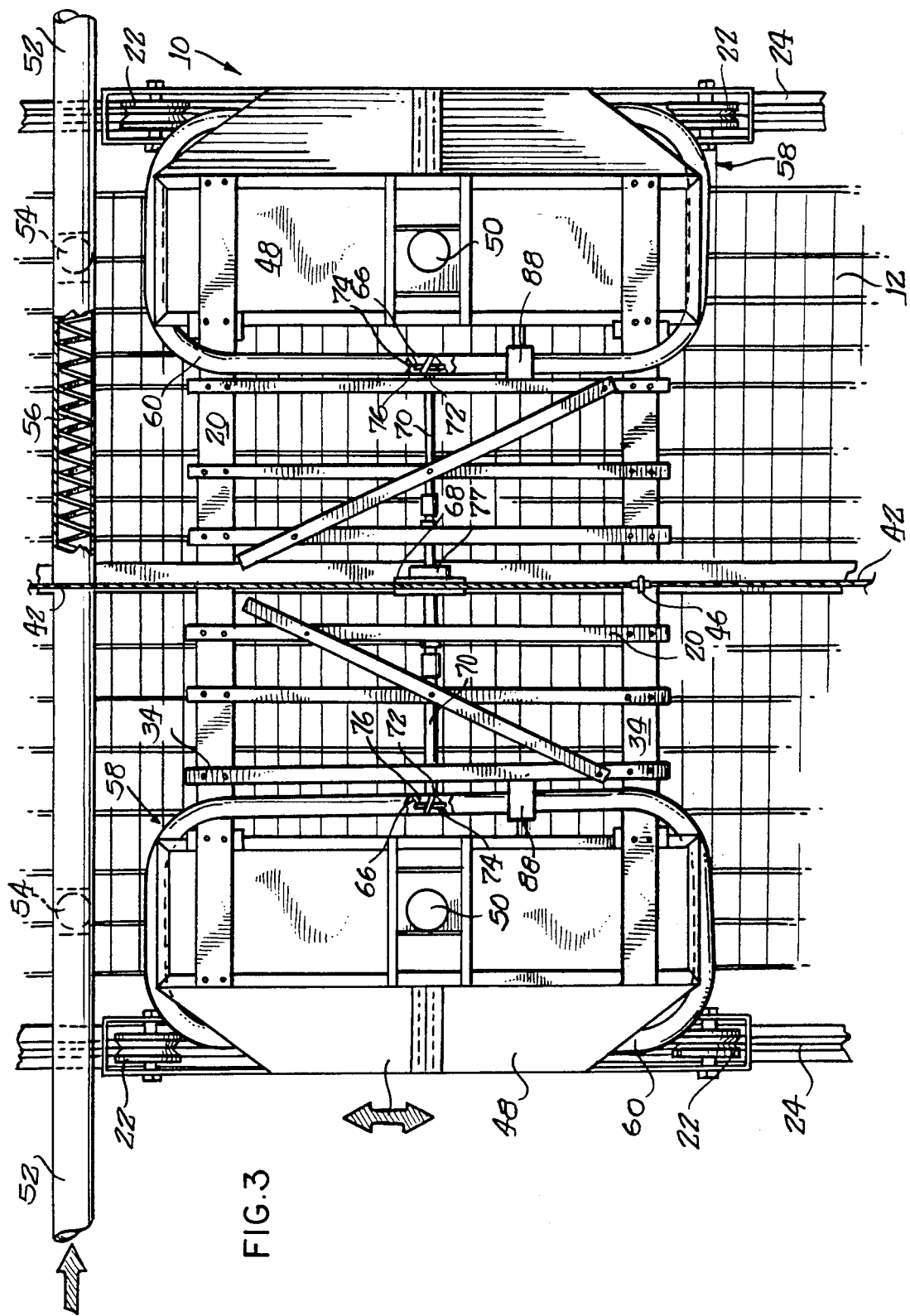
FIG. 3 is a plan view.

Constructed in accordance with a preferred embodiment, the present invention further comprises a pair of hopper means 48 for receiving and maintaining limited amounts of feed for ultimate delivery into the feed trough means 18. The hopper means 48 are mounted for movement in unison with the movable support frame means 20 on each side structure 32 as shown in FIGS. 1-3. Feed inlets 50 are provided in upper portions of the hopper means 48 to enable feed to enter and fill the hopper means 48 to a desired level. For example, a desired level may be enough feed to supply one half inch of feed in each feed trough means 18 for an entire day. Filling of the hopper means 48 can be accomplished manually or automatically by use of a feed supply conduit 52 located adjacent the cage arrangement 12 at some point along a path of travel of the support frame means 20 and hopper means 48. As can easily be envisioned upon reference to FIGS. 1 and 3, once the hopper inlet means 50 have been positioned below an outlet means 54 formed in the feed supply conduit 52, feed can be deposited into the hopper means 48 as desired. Preferably, a continuous helical conveyer element 56 (FIG. 3) is provided within the feed supply conduit 52 and rotated and/or axially advanced in known fashion in order to urge the feed along the feed supply conduit 52 and promote feed discharge through the outlet means 54. Movement of the conveyer element 56 can be discontinued when the desired level of feed in the hopper means 48 has been attained to halt discharge of feed through the outlet means 54.

Figure 6:
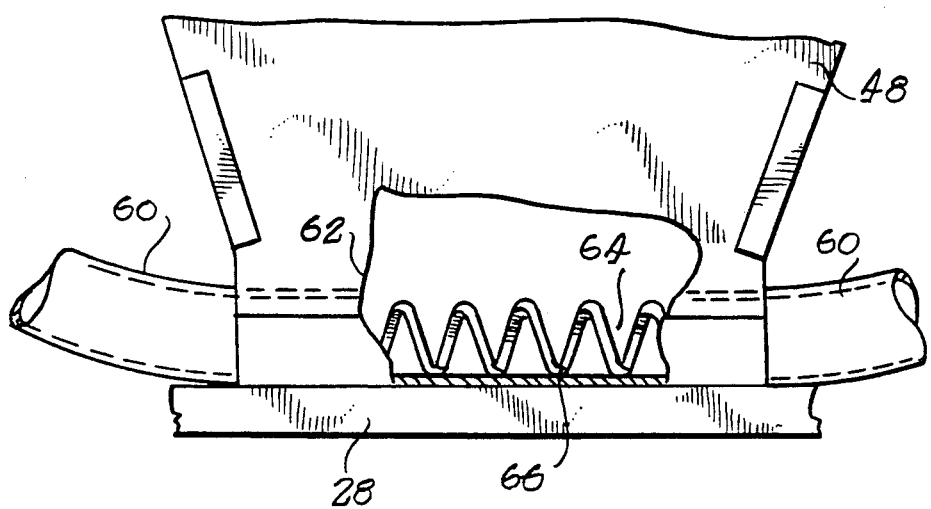
FIG. 6 is an enlarged fragmentary view, partially broken-away, illustrating a lower portion of a hopper means in operative association with a feed delivery means.

In keeping with one of the principle objects of the invention, the controlled transfer of feed from each hopper means 48 to each feed trough means 18 is accomplished in the present instance through the use of a feed delivery means 58. As seen best in FIG. 3, each unique feed delivery means 58 first comprises a continuous conveyor housing means 60 rigidly attached to the support frame means 20. Consequently each conveyor housing means 60 is held in fixed relationship with each hopper means 48. To transfer feed from each hopper means 48 into each conveyor housing 60, each hopper means 48 further includes a feed release aperture 62 (FIG. 6) arranged so as to be in open communication with an opening 64 formed in each conveyor housing 60. Preferably, each release aperture 62 is formed at the lowest point of each hopper means 48 to make certain that feed first placed in a hopper means 48 is the first to exit through the release aperture 62.

As best shown in FIG. 2, each conveyor housing means 60 forms a continuous loop extending from each release aperture 62 upward along the cage arrangement 12 around the vicinity of the hopper inlet means 50 and then bending downward along the cage arrangement 12 and back to the release aperture 62. It is important to note that each feed delivery means 58 further comprises an elongated helical screw member 66 positioned within, and extending completely around each conveyor housing means 60 for receiving feed when in a substantially horizontal position from the hopper means 48 through the conveyor housing opening 64. As can best be understood upon reference to FIG. 6, loading the screw member 66 when it is laying flat causes the member 66 to be filled to capacity and thereby promotes more efficient and effective feed deposit from the delivery means 58 into the trough means 18, as is thoroughly discussed below.

To further facilitate the transfer of feed between each hopper means 48 and each feed delivery means 58, the interior surfaces of each hopper means 48 are preferably constructed free from obstructions thereby creating clean slopes therein. It should be apparent that such a design will promote the fall of feed within the hopper means 48 and prevent feed bridging and problems associated therewith.

In accordance with another important aspect of the present invention, the drive means 36 further comprises a vertical capstan member 68 coupled with a straight shaft means 70 extending towards each feed delivery means 58 as shown best in FIG. 3. At a distal end 72 thereof, each shaft member 70 is provided with a sprocket member 74 which extends through a drive opening 76 formed in an upper portion of each conveyor housing 60. In order to impart controlled rotation to the capstan member 68, shaft means 70 and sprocket members 74, the cable 42 is wound around the capstan member 68 as best seen in FIG. 2. Upon rotation of the vertical capstan member 68, the sprocket members 74 engage and axially advance each screw member 66 within the conveyor housing means 60. In a preferred embodiment, these sprocket members 74 are pitched so as to simultaneously impart a slight rotation to each screw member 66 thereby mixing the constituents of the feed contained in the screw members 66 as the feed is urged along the housing conveyor means 60.

Driving the screw members 66 in the manner described above eliminates the need for timing belts, idlers, timing belt pulleys and other miscellaneous hardware usually seen in prior art devices of this kind.

A preferred embodiment of the invention also includes rachet means 77, as shown best in FIG. 3, for imparting motion to the shaft members 70 only when the vertical capstan 68 is driven in one direction. Accordingly, the screw members 66 are driven by the sprocket members 74 only when the feed car apparatus 10 is traveling in one direction, and not upon a return pass.

Figure 4:
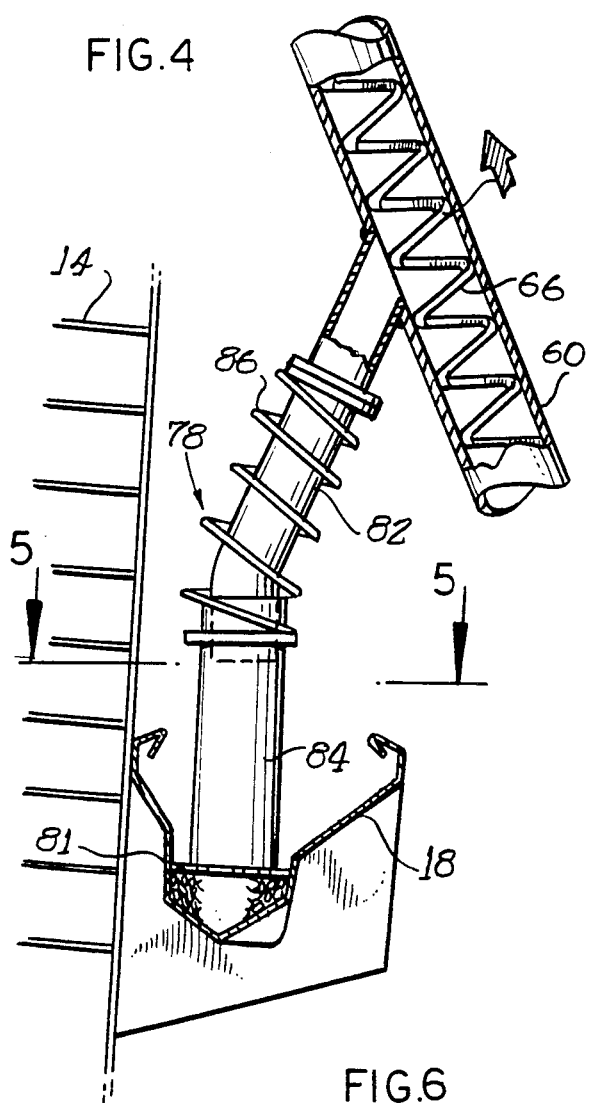
FIG. 4 is an enlarged fragmentary view, partially broken-away, illustrating a drop tube means and leveling member components of the invention in operative association with a feed trough means.
Figure 5:
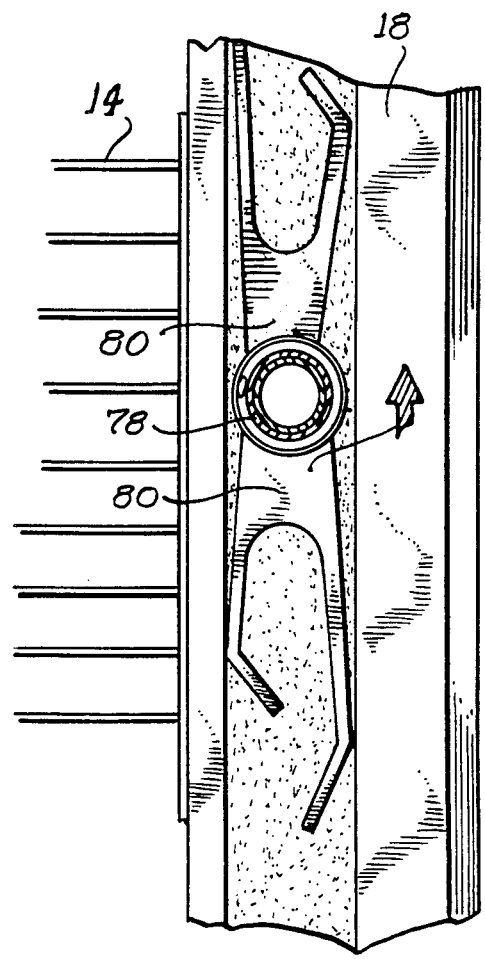
FIG. 5 is a sectional view taken along line 5—5 as shown in FIG. 4.

In accordance with a further aspect of the invention, feed delivery means 58 further comprises a series of drop tube means 78 and leveling members 80 to accurately and efficiently dispense feed from each screw member 66 into each feed trough means 18. As will be understood by reference to FIG. 4 and 5, a constant supply of feed is provided to each drop tube means 78 by the screw member 66 whereupon, when required, it descends through the drop tube means 78 and into the feed trough means 18. Preferably, the vertical relationship between the drop tube means 78 and the leveling member 80 is preset and fixed and the leveling member slides along the trough means 18 thereby functioning to selectively control the amount of feed deposited in the feed trough means 18 and smooth the surface of the feed level as the feed car apparatus 10 progresses along the cage arrangement 12 in the direction of the arrow shown in FIG. 5. As illustrated, the leveling member 80 and a bottom edge 81 of the drop tube means are preset to be at the same vertical distance with respect to the feed trough means 18. However, by adjusting the preset relationship between the drop tube means 78 and the leveling member 80 (by any of several known methods), the amount of feed deposited in the feed trough means 18 can be varied to meet whatever needs are required.

As was discussed above with respect to the manner of driving the screw members 66, filling the trough means 18 in the fashion described is much simpler, requires fewer parts and provides more accurate results than can be achieved by utilizing similar prior art devices.

Minor elevational deviations along the length of the feed trough means 18 may be compensated for by constructing the drop tube means 78 from an upper member 82 and a lower member 84 and providing a yielding means 86 therebetween. As can be understood by reference to FIGS. 4 and 5, the yielding means 86 will function to aid the drop tube means 78 and leveling member 80 in depositing a uniform controlled amount of feed in the feed trough means 18 despite elevational deviations present therein.

Finally, a preferred embodiment of the feed car apparatus 10 further comprises a return means 88 as illustrated in FIGS. 2 and 3. As should be apparent from the drawings, the return means 88 functions to recycle feed not deposited in the feed trough means 18, back into the hopper means 48. Recycling the unused feed back into the hopper means 48 in this manner, rather than carrying the feed all the way around the conveyor housing 60 in the screw member 66 minimizes the chances of feed clogging promotes better feed circulation.

The invention is claimed as follows:

1. Feed car apparatus for supplying feed to an arrangement of bird or animal confinement cages having feed trough means of a predetermined length associated therewith, said feed car apparatus comprising:

hopper means for receiving and maintaining a limited amount of feed;

movable support frame means operatively associated with said hopper means for carrying said hopper means along and adjacent to said feed trough means;

feed delivery means mounted on said hopper means for delivering feed from said hopper means into said feed trough means; and drive means operatively associated with said support frame means and said delivery means for moving said hopper means and operating said delivery means;

wherein, said feed delivery means comprises a continuous moving conveyor element and housing for receiving feed in a horizontal position from said hopper means, a drop tube means for filling said feed trough means and a leveling member operatively associated with the drop tube means for selectively controlling the amount of feed deposited and maintaining a uniform level of feed within the trough means.

2. Feed car apparatus as recited in claim 1, wherein said cage arrangement comprises multiple tiers of confinement cages, said feed trough means comprises shallow elongated receptacles associated with each of said tiers of cages and said feed delivery means further comprises a leveling member constructed and arranged so as to slide along said elongated receptacles and assure the development of a proper amount and level surface of feed within the receptacles.

3. Feed car apparatus as recited in claim 2 wherein said feed delivery means further comprises yielding means operatively associated with said drop tube means for maintaining a proper relationship between said leveling member and said feed receptacles despite minor deviations in said receptacle means.

4. Feed car apparatus as recited in claim 1, wherein said drive means includes a vertical capstan member and a straight shaft means carried by said support frame means for axially advancing and simultaneously rotating said moving conveyor element about a helix axis thereof.

5. Feed car apparatus as recited in claim 1, wherein said hopper means includes obstruction-free interior surfaces to facilitate feed fall and minimize feed bridging within the hopper means.

6. Feed car apparatus as recited in claim 5, wherein ratchet means are provided for causing said continuous moving conveyor element to be driven only when said feed car apparatus is traveling in a predetermined direction.

7. Feed car apparatus as recited in claim 1, further comprising feed return means operatively associated with said feed delivery means for recycling feed from said conveyor element and housing back into said hopper means.

8. A feed car delivery system constructed and arranged so as to move along an array of confinement cages having feed receptacles associated therewith, comprising: hopper means for holding feed; support frame means for carrying said hopper means along said cages and feed receptacles; delivery means including a continuous helical conveying element substantially surrounded by a housing member for receiving feed from said hopper means when said helical conveying element is positioned horizontally.

9. A feed car delivery system as recited in claim 8, further comprising drive means for driving said support frame means including a vertical capstan member operatively associated with a straight shaft means for simply and effectively operating said delivery means.

10. A feed car delivery system as recited in claim 8, wherein said delivery means further comprises drop tube means for filling said feed trough means and a leveling member operatively associated with the drop tube means for selectively controlling the amount of feed deposited in said feed receptacles and for maintaining a uniform level of feed within said feed receptacles.

11. A feed car delivery system as recited in claim 9, wherein said drive means further comprises a sprocket member operatively associated with said straight shaft means for axially advancing and simultaneously rotating said helical conveying element about a helix axis thereof.

12. A feed car delivery system as recited in claim 10, wherein said leveling member slides along said feed receptacles to insure the development of a predetermined amount and a level surface of feed within the receptacles.

13. A feed car delivery system as recited in claim 12, further comprising yielding means operatively associated with said drop tube means for maintaining a proper relationship between said leveling member and said feed receptacles despite minor deviations in said feed receptacles.

14. A feed car delivery system as recited in claim 8, further comprising ratchet means for causing said delivery means to operate only when said feed car delivery system is traveling in a predetermined direction.

15. A feed car delivery system as recited in claim 8, further comprising feed return means operatively associated with said delivery means for recycling feed from said helical conveying element back into said hopper means.

16. A feed car delivery system as recited in claim 8, wherein said hopper means includes obstruction-free interior surfaces to facilitate feed fall and minimize feed bridging within the hopper means.

* * * * *